US007188167B2

(12) United States Patent
Hallin

(10) Patent No.: US 7,188,167 B2
(45) Date of Patent: Mar. 6, 2007

(54) METHOD AND SYSTEM FOR REGISTERING MULTIPLE COMMUNICATION DEVICES OF A USER IN A SESSION INITIATION PROTOCOL (SIP) BASED COMMUNICATION SYSTEM

(75) Inventor: Thomas G. Hallin, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 118 days.

(21) Appl. No.: 10/804,918

(22) Filed: Mar. 19, 2004

(65) Prior Publication Data

US 2005/0207424 A1 Sep. 22, 2005

(51) Int. Cl.
G06F 15/16 (2006.01)
G06F 15/173 (2006.01)

(52) U.S. Cl. ............ 709/223; 709/229; 709/239; 709/240; 709/244

(58) Field of Classification Search ........... 709/204, 709/206, 207, 217–218, 219, 223, 229, 239, 709/240, 244; 455/414; 370/352
See application file for complete search history.

(56) References Cited

U.S. PATENT DOCUMENTS

| | | | | |
|---|---|---|---|---|
| 5,930,700 A | * | 7/1999 | Pepper et al. | 455/435.3 |
| 6,374,246 B1 | * | 4/2002 | Matsuo | 709/218 |
| 6,741,853 B1 | * | 5/2004 | Jiang et al. | 709/219 |
| 6,975,864 B2 | * | 12/2005 | Singhal et al. | 455/438 |
| 2001/0025280 A1 | * | 9/2001 | Mandato et al. | 709/217 |
| 2003/0135569 A1 | * | 7/2003 | Khakoo et al. | 709/206 |
| 2004/0053573 A1 | * | 3/2004 | Karusawa | 455/41.2 |
| 2004/0083282 A1 | * | 4/2004 | Shiga et al. | 709/223 |
| 2004/0098507 A1 | * | 5/2004 | Thubert et al. | 709/207 |
| 2004/0136358 A1 | * | 7/2004 | Hind et al. | 370/352 |
| 2004/0162870 A1 | * | 8/2004 | Matsuzaki et al. | 709/200 |
| 2004/0192307 A1 | * | 9/2004 | Watanabe et al. | 455/436 |
| 2005/0071428 A1 | * | 3/2005 | Khakoo et al. | 709/204 |
| 2006/0041650 A1 | * | 2/2006 | Luo et al. | 709/223 |

OTHER PUBLICATIONS

"Overview of the Session Initiation Protocol", Guide to Cisco Systems' VoIP Infrastructure Solution for SIP, Chapter 1, OL-1002-01, pp. 1-1 to 1-8.

* cited by examiner

Primary Examiner—Rupal Dharia
Assistant Examiner—Quang N. Nguyen
(74) Attorney, Agent, or Firm—Kevin D. Wills

(57) ABSTRACT

A session initiation protocol (SIP) based communication system registers a number of different device types (10, 50) in a database (30). Each type of communication device is registered including a communication device description, internet protocol address, priority, registration time, and expiration time (80). When a call is received by the network (20), the communication device at which to reach the user is first selected by priority (116) and then by registration time of the communication device (122).

4 Claims, 4 Drawing Sheets

| DESCRIPTION | IP | PRIMARY | REGISTRATION TIME | EXPIRES |
|---|---|---|---|---|
| MS | 1.1.1.1 | 1 | T1 | 10 HOURS |
| ↑41 | ↑42 | ↑43 | ↑44 | ↑45 |

40   *FIG. 3*

| DESCRIPTION | IP | PRIMARY | REGISTRATION TIME | EXPIRES |
|---|---|---|---|---|
| MS | 1.1.1.1 | 1 | T1 | 10 HOURS |
| PC | 2.2.2.2 | 1 | T2 | 1 HOUR |
| ↑56 | ↑57 | ↑58 | ↑59 | ↑60 |

| DESCRIPTION | IP | PRIMARY | REGISTRATION TIME | EXPIRES |
|---|---|---|---|---|
| MS | 1.1.1.1 | 0.5 ←65 | T3 | 10 HOURS |
| PC | 2.2.2.2 | 1 | T2 | 1 HOUR |

66                                                64

| DESCRIPTION | IP | PRIMARY | REGISTRATION TIME | EXPIRES |
|---|---|---|---|---|
| MS | 3.3.3.3 | 1 | T4 | 10 HOURS |
| PC | 2.2.2.2 | 1 | T2 | 1 HOUR |

METHOD AND SYSTEM FOR REGISTERING MULTIPLE COMMUNICATION DEVICES OF A USER IN A SESSION INITIATION PROTOCOL (SIP) BASED COMMUNICATION SYSTEM

BACKGROUND OF THE INVENTION

The present invention pertains to packet data communications and more particularly to a method for multi-device registration in a session initiation protocol based packet data communications system.

In packet data networks, standard session initiation protocol (SIP) based registration allows a user to register many different contact addresses, but not many different user terminal devices. Typically a user will register with a particular contact address to allow the network to locate their current position and terminate call traffic to that position.

In a situation where a user may have several different contact addresses, for example a personal computer coupled to the network via a SIP interface and a mobile station (cell phone) coupled via a SIP interface to the network, there is a problem deciding which user terminal device should be used when making a call to such a user with multiple terminal devices. The originator's client will query the network to determine a current location of the user and will need to decide whether it is likely that the user is located at his or her personal computer or his or her mobile station, for example.

Currently, session initiation protocol within packet data networks allow the network to INVITE a particular user at all his or her contact locations simultaneously. Alternately, some SIP based systems allow the call to a multi terminal device user to proceed to the various devices in a sequential list stored within the network. Some prioritization may be included in such SIP systems to allow some selection. These approaches create excessive traffic within the network and often lead to wrong choices of terminal devices for the user.

Accordingly, what is needed is a method to improve selection of a device and corresponding contact address that is likely to reach the called user without requiring expending excessive network resources by inviting the user at all registered contact addresses.

BRIEF DESCRIPTION OF THE DRAWINGS

FIG. 3 is a layout of a database entry corresponding to a registration of a mobile user of FIG. 1.

PREFERRED EMBODIMENT OF THE INVENTION

Packet data networks which support session initiation protocol (SIP) allow a user to register more than one type of terminal device. These terminal devices may be personal computers, both fixed and mobile, and hand held devices such as cell phones. Many systems do not support push-to-talk functions. With the advent of push-to-talk as a highly usable feature, push-to-talk mobile devices may also be a registered terminal device. These devices may be embedded in personal computers or cell phones or perhaps, stand alone devices.

Figure 1:
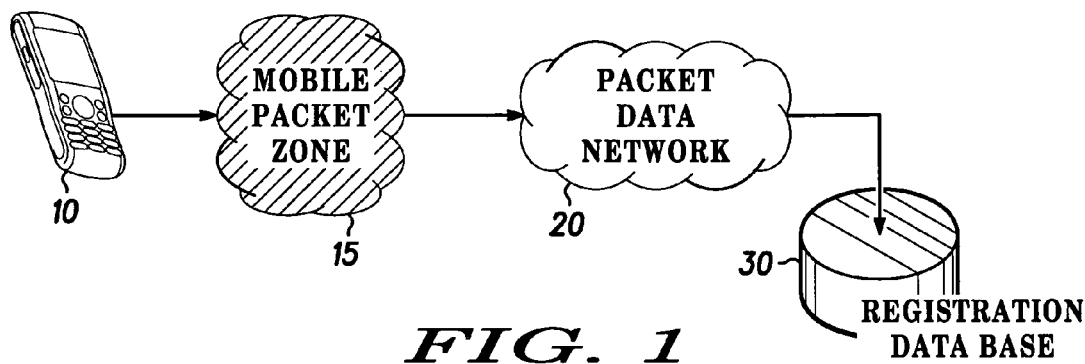
FIG. 1 is a block diagram of a registration of a mobile user.

Referring to FIG. 1, a block diagram of an initial registration of a mobile station (cell phone) is depicted. A user for example, at time T1, may register with packet data network 20 in registration database 30 as a mobile cell phone 10 user. At time T1 mobile cell phone 10 is within mobile packet zone 15.

Figure 2:
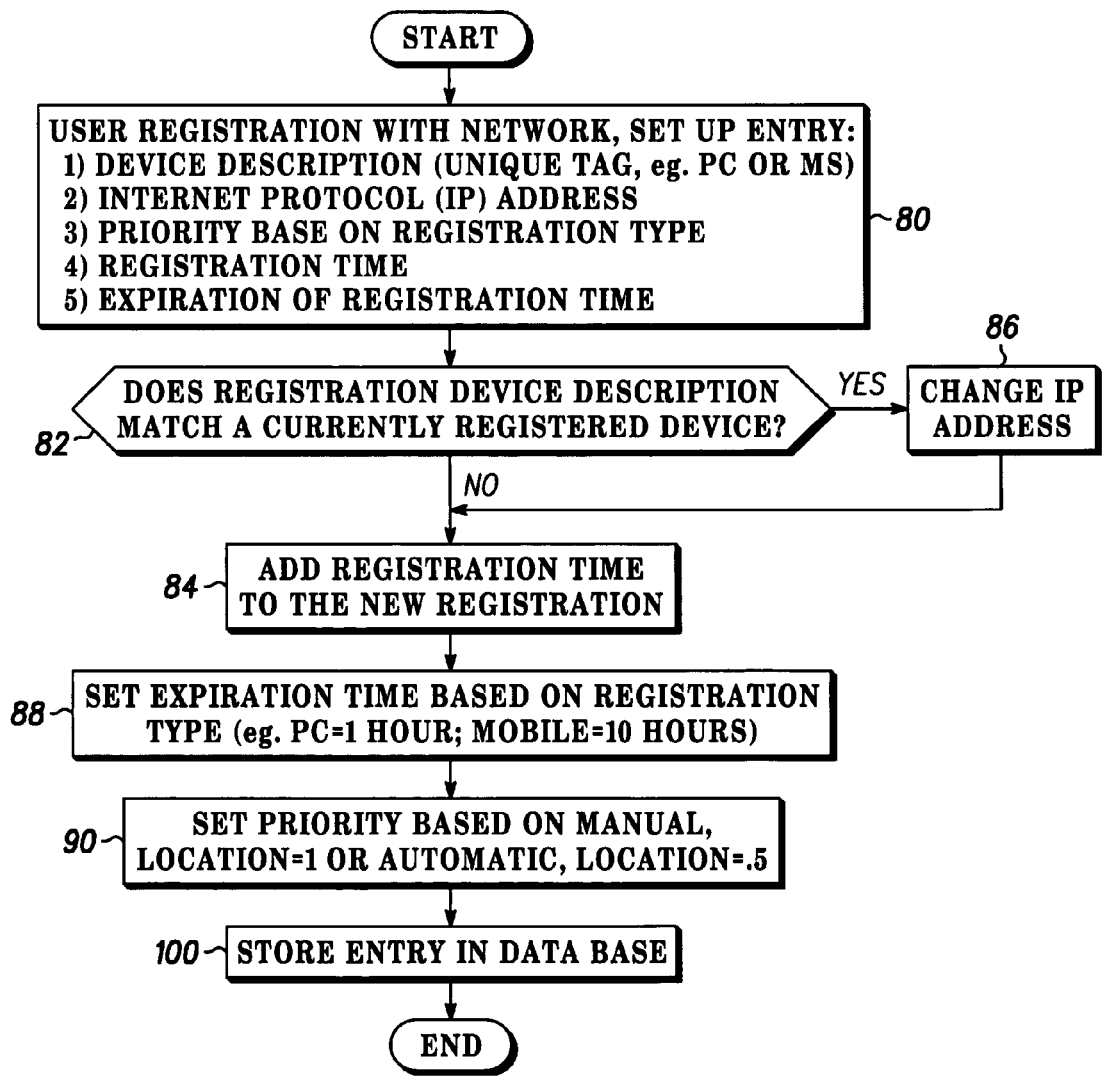
FIG. 2 is a flow chart of a method for set up of a database entry for a user in accordance with the present invention.

This registration process occurs as shown in FIG. 2. The corresponding database entry 40 is depicted in FIG. 3. Referring to FIGS. 2 and 3 block 80 of FIG. 2 is entered for a user registration with network 20 to set up database entry 40. The first field of the database entry 41 is a device description. The device description is implemented via a unique tag which indicates a particular user and indicates whether, for example, the device is a PC or mobile station. In the present example device 10 is a mobile station and field 41 includes an MS indication indicating mobile station.

Next, in block 80 it is indicated that the internet protocol address is obtained from the network and placed in the IP (Internet Protocol) address field 42. For the present example of mobile station 10 the IP address is 1.1.1.1. For database entry 40 the priority field 43, registration time field 44 and expiration field 45 are also allocated.

Next, block 82 determines whether the registration device description matches a currently registered device. If yes, block 82 transfers control to block 86 via the yes path. Block 86 changes the internet protocol address of the current database entry for this user device and transfers control to block 84.

Block 84 adds the registration time to the new registration for mobile station 10 in the registration time field. The registration time set in field 44 is T1. Next, block 88 sets the expiration time based upon the device registration type. That is, in a preferred embodiment for personal computers the expiration is set for one hour and for mobile stations the expiration is set in a preferred embodiment for 10 hours. Since this is a mobile station 10, field 45 is set to 10 hours. Since mobile stations are capable of being transported from place to place readily, a 10 hour expiration time was selected. Since personal computers typically are fixed, an expiration time of much less, one hour, was selected. These expiration times may be set according to any methodology, but in a preferred embodiment the mobile station time will be set to 10 hours and the personal computer time set to one hour.

Next, the priority of the entry is set based upon whether the registration is an automatic re-registration in which case the priority is set to 0.5 or a manual or location based registration which has higher priority and is set equal to 1. In this case it is a location based priority because mobile station 10 is a location based entity and the priority is set to 1 in field 43 by block 90. Lastly, block 100 stores the entire entry as depicted in FIG. 3 in database 30. The process is then ended.

Figures 4, 5, 6:
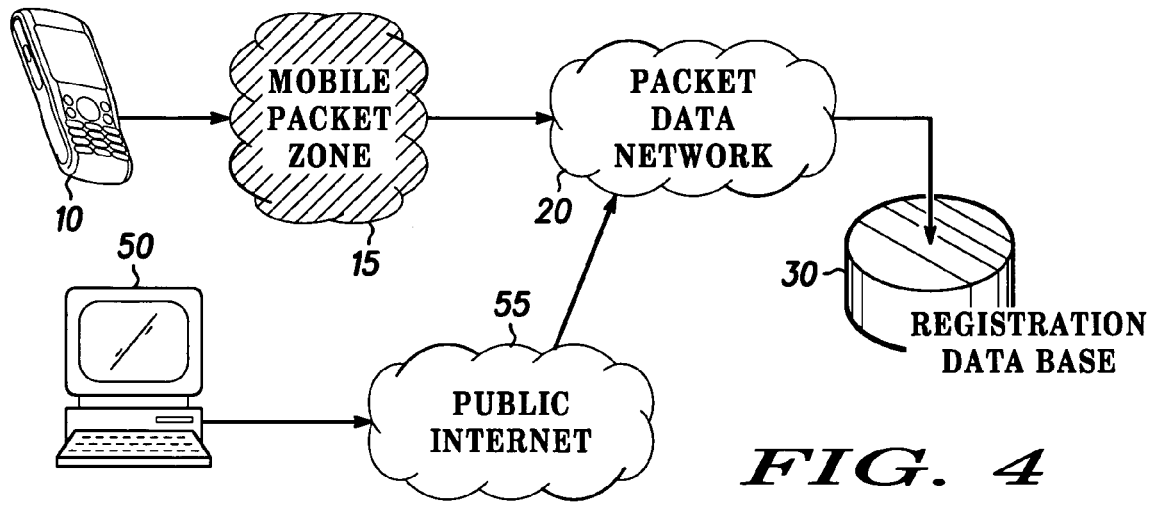
FIG. 4 is a block diagram of a registration of the same user through a personal computer.
FIG. 5 is a layout of a contact list or registration of a user having multiple terminal devices in accordance with the present invention.
FIG. 6 is a layout of a database entry for multiple terminal devices in accordance with the present invention.

FIG. 4 depicts a block diagram of a registration via a personal computer 50 at time T2 by the same user as FIG. 1. FIG. 5 depicts the corresponding database entry. The user may have registered via mobile station 10 when he left home for the office. Now that the user is at the office he then registers via his personal computer 50 and the public internet at time T2 with packet data network 20 and registration database 30.

The setup method beginning at block 80 is initiated, and the device description with a unique tag PC is entered into the device description field 56. Next, the network 20 enters the IP address 2.2.2.2 in the IP address field 57. Next, block 82 determines whether the device registration is a match to a current registration, since it is not block 82 transfers control via the no path to block 84.

Next, block 84 adds the registration time to this new registration for the PC. As a result, time T2 is entered into field 59 for the registration time. Then the expiration time is set by block 88. Since this is a PC attempting to register, the expiration time is set equal to 1 hour in field 60.

Next, the priority of the PC 50 registration is set based upon whether registration is an automatic or manual or location based registration. Since this is an initial manual registration, the priority is set equal to 1 in field 58. Lastly, block 100 stores this entry in database 30. Then the process is ended.

FIG. 6 depicts a resulting database entry for an automatic re-registration by mobile station 10 at time T3. Block 30 receives the device description and IP address. Next, block 82 determines whether the device description matches a currently registered device. Since it does, block 82 transfers control to block 86 via the yes path. Since the IP address is not changed, block 86 transfers control to block 84. Block 84 adds the registration time T3 in field 64. In block 88 the expiration time is again set to ten hours since it is a mobile station.

Figures 7, 8:
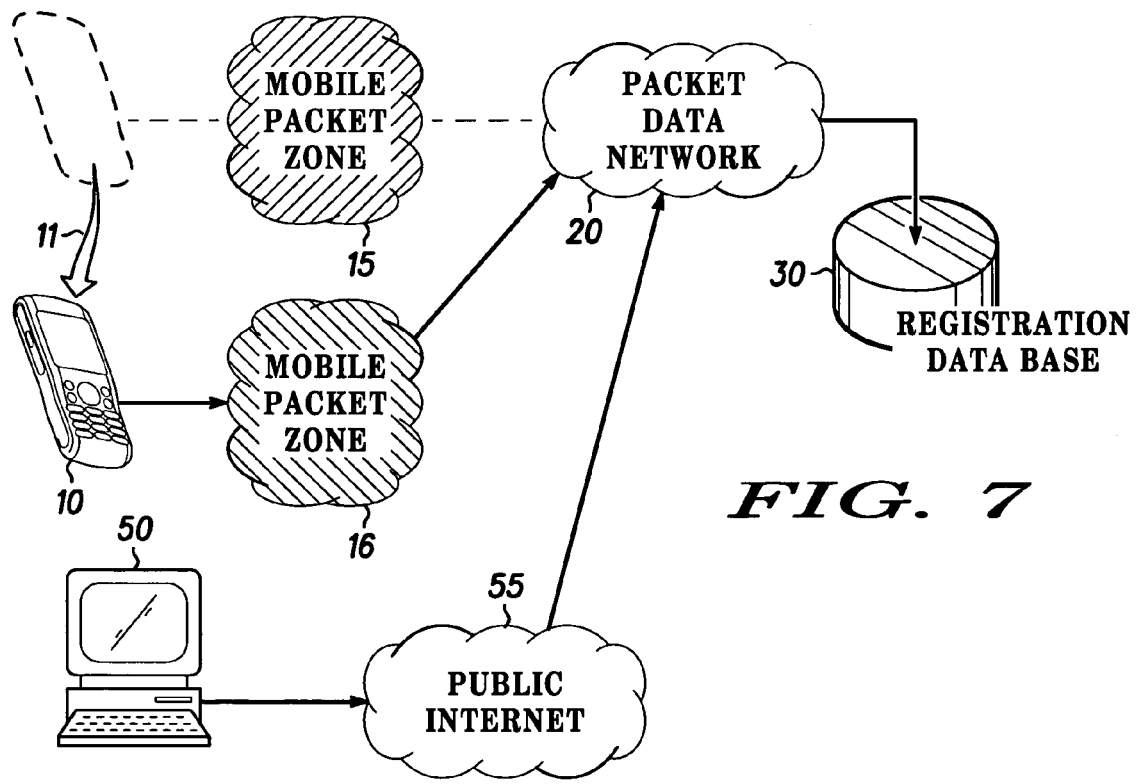
FIG. 7 is a block diagram depicting movement by a mobile user in accordance with the present invention.
FIG. 8 is a layout of a database entry reflecting movement of a mobile user in accordance with the present invention.

Next, the priority in field 65 is set to an automatic priority or 0.5 since this is an automatic re-registration by block 90. Lastly, the entry as shown in FIG. 6 is stored in the database 30. FIG. 7 depicts a movement by mobile station 10 via path 11 from mobile packet zone 15 to mobile packet zone 16 at time T4.

The device description and IP address are selected by block 80. Next, block 82 determines whether the device registration matches a currently registered device. Since it does, block 82 transfers control to block 86 via the yes path. Since there is a new IP address associated with the movement of mobile station 10 to mobile packet zone 16, a new IP address is entered into field 68. The address is 3.3.3.3. Then block 86 transfers control to block 84. Block 84 adds the registration time for mobile unit 10 in packet zone 16 as time T4 in field 70.

Next, block 88 sets the expiration time. Since the device is a mobile station, the ten hour expiration time is set in field 71. Next, block 90 sets the priority in field 69. Since the priority is location based since mobile station 10 has moved to packet zone 16, the priority is set equal to 1. The database entry as shown in FIG. 8 is then stored in database 30.

Figure 9:
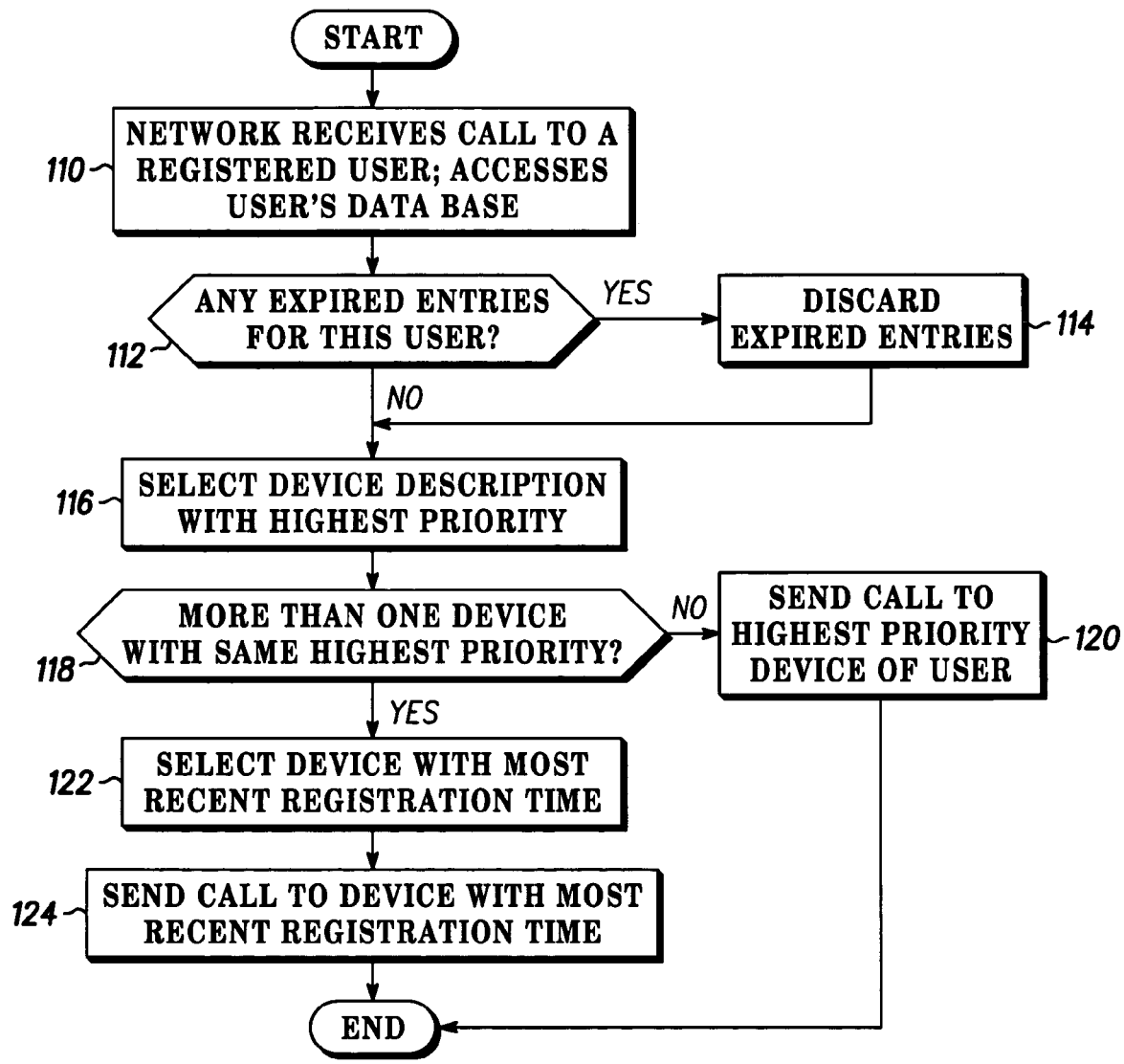
FIG. 9 is a flow chart of a method for routing calls in accordance with the present invention.

Now referring to FIG. 9, the method for call routing based upon registration database 30 is shown. The routing method is entered and block 110 is given control. Block 110 receives the call to the registered user. Next, block 112 determines whether there are any expired entries for this user. If there are expired entries for this user, block 112 transfers control to block 114 via the yes path. Block 114 discards any expired entries. Next, block 114 transfers control to block 116. Also, if there are no expired entries for this user, block 112 transfers control to block 116 via the no path.

Block 116 selects the device description for a particular user having the highest priority. Referring to FIG. 8 as an example, the priority for the user's mobile station 67 and PC 66 are the same in field 69 and 69'. The priority for both mobile station and personal computer in field 69 and 69' is 1. There is no highest priority device so block 116 transfers control to block 118. Block 118 determines whether there is more than one device with the same highest priority. If there is not, block 118 transfers control to block 120 via the no path. Block 120 sends the call to the highest priority device of the user and the process is ended. If there is more than one device with the same highest priority, as is the case in FIG. 8, block 118 transfers control to block 122 via the yes path. Block 122 selects the device with the most recent registration time. Since the registration of mobile station (MS) 10 in packet zone 16 came at time T4 (see field 70) and the personal computer registration time was at T2 (see field 70') which is prior to registration time T4, this is the most recent time. The user is most likely to be at this location. As a result, the mobile station is selected as the most likely device to reach the user. Next, block 124 sends the call to the device with the most recent registration time. In this example of FIG. 8, this is the mobile user at the mobile station. The process is then ended.

As can be seen from the above description, this method allows the selection of the device most likely to be used by the called party at the present time. This method allows SIP users to register devices and not merely contact addresses. The method selects the best choice alternative for call routing when a user has multiple contact devices. Selection is based first on priority and second upon registration time. Although these may be interchanged under certain circumstances. As a result, the methodology of the present invention provides substantial time improvements in call setup and minimizes network traffic as a result of a user with multiple devices.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for registering multiple communication devices in a Session Initiation Protocol (SIP) based communication system comprising the steps of:
   identifying a communication device for registration by a user for providing an identified communication device;
   setting a registration time of the identified communication device for registering the identified communication device of the user;
   selecting an expiration registration time corresponding to the identified communication device and based upon a type of the identified communication device, wherein the expiration registration time selected for a first type of identified communication device is a first value, wherein the expiration registration time selected for a second type of identified communication device, is a second value, the second value being greater than the first value;
   selecting a priority for the identified communication device based upon one or more of the type of the identified communication device, a type of registration by the user of the identified communication device and a location of the identified communication device, wherein the step of selecting the priority for the identified communication device further comprises:
      selecting a first priority based upon a location of a mobile station or based on a manual registration; and
      selecting a second priority for an automatic registration or re-registration, wherein the first priority is higher than the second priority; and storing the identified communication device, the priority, the registration time and the expiration registration time corresponding to the identified communication device in an entry in a database.

2. A method for expediting a call to a registered user of multiple communication devices in a Session Initiation Protocol (SIP) based communication system comprising the steps of:

receiving by a network a call to the registered user in the SIP based communication system;

accessing an entry of a database for the registered user;

selecting by the network a device description having a highest priority and a most recent registration time in the entry of the database, wherein the step of selecting a device description by the network includes the steps of:

determining by the network whether there is more than one communication device of the registered user having the highest priority;

if there is not more than one communication device having the highest priority, sending by the network the call to the communication device having the highest priority; and if there is more than one communication device with the highest priority, selecting by the network a communication device from the database having a most recent registration time and sending by the network the call to the communication device having the highest priority and the most recent registration time; and coupling the expedited call to a communication device of the multiple communication devices having the highest priority and the most recent registration time.

3. A method for registering multiple communication devices in a Session Initiation Protocol (SIP) based communication system comprising the steps of:

identifying a communication device for registration by a user for providing an identified communication device;

setting a registration time of the identified communication device for registering the identified communication device of the user;

selecting an expiration registration time corresponding to the identified communication device and based upon a type of the identified communication device;

selecting a priority for the identified communication device in the SIP based communication system based upon the type of the identified communication device, wherein the step of selecting the priority for the identified communication device further comprises:

selecting a first priority based upon a location of a mobile station or based on a manual registration; and selecting a second priority for an automatic registration or re-registration, wherein the first priority is higher than the second priority; and storing the identified communication device, the priority, the registration time and the expiration registration time corresponding to the identified communication device in an entry in a database.

4. A method for registering multiple communication devices in a Session Initiation Protocol (SIP) based communication system comprising the steps of:

identifying a communication device for registration by a user for providing an identified communication device;

selecting a priority for the identified communication device based upon one or more of the type of the identified communication device, a type of registration by the user of the identified communication device and a location of the identified communication device, wherein the step of selecting the priority for the identified communication device further comprises:

selecting a first priority based upon a location of a mobile station or based on a manual registration; and selecting a second priority for an automatic registration or re-registration, wherein the first priority is higher than the second priority; and storing the identified communication device and the priority corresponding to the identified communication device in an entry in a database.

* * * * *